(12) United States Patent
Lim et al.

(10) Patent No.: US 9,727,131 B2
(45) Date of Patent: Aug. 8, 2017

(54) USER INPUT METHOD FOR USE IN PORTABLE DEVICE USING VIRTUAL INPUT AREA

(71) Applicant: Samsung Electronics Co., Ltd., Suwon-si (KR)

(72) Inventors: Soochul Lim, Seoul (KR); Joonah Park, Seoul (KR); Namjoon Kim, Anyang-si (KR); Du-Sik Park, Suwon-si (KR); Jungsoon Shin, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 119 days.

(21) Appl. No.: 14/692,887

(22) Filed: Apr. 22, 2015

(65) Prior Publication Data

US 2016/0116983 A1    Apr. 28, 2016

(30) Foreign Application Priority Data

Oct. 23, 2014    (KR) .................. 10-2014-0144116

(51) Int. Cl.
*G06F 3/01* (2006.01)
*G06F 3/0488* (2013.01)
*G06F 1/16* (2006.01)

(52) U.S. Cl.
CPC ............ *G06F 3/011* (2013.01); *G06F 1/1639* (2013.01); *G06F 1/1647* (2013.01); *G06F 3/0488* (2013.01)

(58) Field of Classification Search
CPC .... G06F 3/011; G06F 3/0484; G06F 3/04842; G06F 3/04845; G06F 3/04847; G06F 3/0485; G06F 3/0486; G06F 3/0487; G06F 3/0488; G06F 3/03547; G06F 1/1639; G06F 1/1647; H04M 2250/22; H04M 2250/54

See application file for complete search history.

(56) References Cited

U.S. PATENT DOCUMENTS

| | | |
|---|---|---|
| 5,601,222 A | 2/1997 | Haddad |
| 8,228,315 B1 | 7/2012 | Starner et al. |
| 8,624,836 B1 | 1/2014 | Miller et al. |
| 8,743,079 B2 | 6/2014 | Norieda |
| 2010/0171694 A1 | 7/2010 | Lu et al. |
| 2010/0240390 A1* | 9/2010 | Russ .................. H04M 1/0256 455/456.1 |

(Continued)

FOREIGN PATENT DOCUMENTS

| | | |
|---|---|---|
| JP | 2006-133932 A | 5/2006 |
| JP | 2014-106765 A | 6/2014 |

(Continued)

*Primary Examiner* — Tom Sheng
(74) *Attorney, Agent, or Firm* — NSIP Law

(57) ABSTRACT

A portable device and user input method of the portable device using a virtual input area is provided. The portable device may include a sensor configured to sense a user input to an input area, the input area being at least a portion of an area adjacent to the portable device, a determiner configured to determine a target object corresponding to the user input among at least one input object displayed on the portable device, based on an arrangement of the at least one input object, and a controller configured to generate a control command to control the target object.

20 Claims, 29 Drawing Sheets

(56) References Cited

U.S. PATENT DOCUMENTS

| | | | |
|---|---|---|---|
| 2011/0043702 A1* | 2/2011 | Hawkins | G06F 3/011 |
| | | | 348/584 |
| 2012/0017147 A1* | 1/2012 | Mark | G06F 1/1639 |
| | | | 715/702 |
| 2013/0013229 A1 | 1/2013 | Norieda et al. | |
| 2013/0044912 A1* | 2/2013 | Kulkarni | G06K 9/00671 |
| | | | 382/103 |
| 2014/0055352 A1 | 2/2014 | Davis et al. | |
| 2014/0098018 A1 | 4/2014 | Kim et al. | |
| 2014/0104180 A1 | 4/2014 | Schaffer | |
| 2015/0054730 A1* | 2/2015 | Kodama | G09G 3/001 |
| | | | 345/156 |
| 2015/0241968 A1* | 8/2015 | Brehmer | G06F 1/163 |
| | | | 345/156 |
| 2016/0127624 A1* | 5/2016 | Woo | H04N 5/2258 |
| | | | 348/36 |
| 2016/0188195 A1* | 6/2016 | Chen | G06F 3/04883 |
| | | | 715/765 |

FOREIGN PATENT DOCUMENTS

| | | |
|---|---|---|
| KR | 10-2009-0061179 A | 6/2009 |
| KR | 10-1019018 B1 | 3/2011 |

\* cited by examiner

USER INPUT METHOD FOR USE IN PORTABLE DEVICE USING VIRTUAL INPUT AREA

CROSS-REFERENCE TO RELATED APPLICATION(S)

This application claims the benefit under 35 USC 119(a) of Korean Patent Application No. 10-2014-0144116, filed on Oct. 23, 2014, in the Korean Intellectual Property Office, the entire disclosure of which is incorporated herein by reference for all purposes.

BACKGROUND

Field

The following description relates to a user input method for use in a portable device.

Description of Related Art

Recently, various user interfaces (UIs) have been provided to users for convenient control environments. A user input scheme of a portable device may include, for example, a touch input scheme using a touch screen.

In a device with a small-sized touch screen, for example, a wearable device, the touch input scheme may cause inconvenience. For example, a screen of a wearable device may be partially covered with a user's finger that touches the screen, or it may be difficult to display various menus on a single screen due to a restriction on a size of the screen. Accordingly, there is a desire for a convenient user input scheme without a limitation to a size of a screen.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a portable device including a sensor configured to sense a user input to an input area, the input area being at least a portion of an area adjacent to the portable device, a determiner configured to determine a target object corresponding to the user input among at least one input object displayed on the portable device, based on an arrangement of the at least one input object, and a controller configured to generate a control command to control the target object.

The determiner may be further configured to map a position of the user input to the input area and a position of the target object in the arrangement of the at least one input object, and to determine the target object.

The determiner may be further configured to divide the input area into a plurality of cells, based on a number of the at least one input object, and to determine the target object, based on a cell in which the user input is sensed among the plurality of cells.

The determiner may be further configured to divide the input area into cells with A rows and B columns, in response to the at least one input object being arranged in the A rows and the B columns, and to determine the target object, based on a cell in which the user input is sensed among the cells. A and B may be natural numbers.

The portable device may further include a display configured to display the at least one input object. The controller may be further configured to display a cursor corresponding to a position of an input tool for the user input on the display.

The controller may be further configured to change the arrangement of the at least one input object, based on a width of an input tool for the user input.

The determiner may be configured to divide the input area into a plurality of cells, based on the changed arrangement, and to determine the target object, based on a cell in which the user input is sensed among the plurality of cells.

The controller may be further configured to generate a drag command to drag the target object, in response to the user input being a drag input for dragging the input area from one point to another point.

The controller may be further configured to generate a control command to control an operation mapped in advance to the target object, in response to the drag input.

In another general aspect, there is provided a portable device including an output unit configured to output at least one input object to an input area, the input area being at least a portion of an area adjacent to the portable device, a sensor configured to sense a user input to the input area, a determiner configured to determine a target object corresponding to the user input among the at least one input object, and a controller configured to generate a control command to control the target object.

The controller may be further configured to change an arrangement of the at least one input object, based on an angular factor representing an angle of a user's wrist.

The controller may be further configured to change a number of the at least one input object, based on the angular factor.

The angular factor may be determined based on a degree of proximity of a back of a user's hand to the sensor.

The controller may be further configured to generate a drag command to drag the target object, in response to the user input being a drag input for dragging the input area from one point to another point.

The controller may be further configured to generate a control command to control an operation mapped in advance to the target object, in response to the drag input.

In still another general aspect, there is provided a portable device including a sensor configured to sense a user input to an input area, the input area being at least a portion of an area adjacent to the portable device, a determiner configured to determine a target object corresponding to the user input among at least one input object displayed on an external device, based on an arrangement of the at least one input object, the external device being distinguished from the portable device, a controller configured to generate a control command to control the target object, and a communicator configured to transmit the control command to the external device.

The determiner may be further configured to map a position of the user input to the input area and a position of the target object in the arrangement of the at least one input object, and to determine the target object.

The determiner may be further configured to divide the input area into cells with A rows and B columns, in response to the at least one input object being arranged in the A rows and the B columns, and to determine the target object, based on the cells. A and B may be natural numbers.

The external device may include a display configured to display the at least one input object. The controller may be further configured to display a cursor corresponding to a position of an input tool for the user input on the display.

The controller may be further configured to generate a drag command to drag the target object, in response to the user input being a drag input for dragging the input area from one point to another point.

Other features and aspects will be apparent from the following detailed description, the drawings, and the claims.

Figure 1:
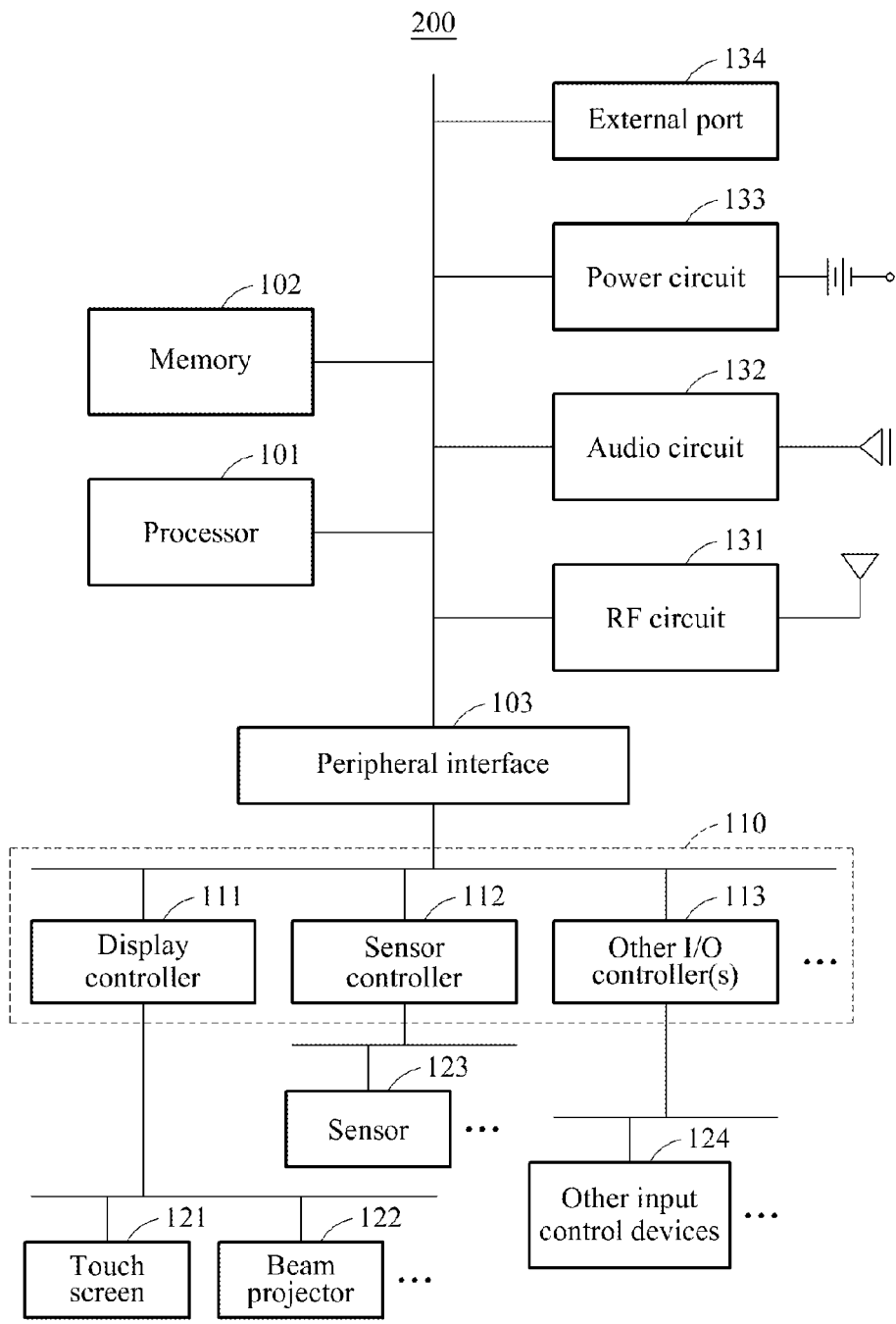
FIG. 1 illustrates an example of a portable device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Like reference numerals in the drawings denote like elements, and redundant descriptions of like elements will be omitted herein. When it is determined a detailed description of a related known function or configuration they may make the purpose of the present invention unnecessarily ambiguous in describing the present invention, the detailed description will be omitted herein.

FIG. 1 illustrates an example of a portable device.

Referring to FIG. 1, the portable device 200 includes at least one processor 101, a memory 102, a peripheral interface 103, an input/output (I/O) subsystem 110, a touch screen 121, a beam projector 122, a sensor 123, other input control devices 124, a radio frequency (RF) circuit 131, an audio circuit 132, a power circuit 133, and an external port 134. The above components may communicate with each other through at least one communication bus or at least one signal line.

The portable device 200 of FIG. 1 is merely an example and accordingly, may include more or fewer components than shown in FIG. 1, may combine at least two components, or may have a different configuration or arrangement of the components. The components shown in FIG. 1 may be implemented in hardware, software, or a combination of both hardware and software, including one or more signal processing and/or application specific integrated circuits.

The memory 102 may include, for example, a high-speed random access memory (RAM), a magnetic disc, a static RAM (SRAM), a dynamic RAM (DRAM), a read only memory (ROM), a flash memory, or a nonvolatile memory. The memory 102 may include a software module, a set of instructions, or other data required for an operation of the portable device 200. Additionally, an access to the memory 102 by the other components, for example, the processor 101 or the peripheral interface 103 may be controlled by the processor 101.

The peripheral interface 103 couples an I/O peripheral device of the portable device 200 to the processor 101 and the memory 102. The processor 101 may execute the software module or the set of instructions stored in the memory 102, to perform various functions for the portable device 200 and to process data.

The RF circuit 131 transmits and receives an RF signal known as an electromagnetic signal. The RF circuit 131 may convert an electronic signal to or from an electromagnetic signal, and may communicate with a communication network and other communication devices via the electromagnetic signal. To perform the above functions, the RF circuit

131 may include a well-known circuit. The well-known circuit may include, but is not limited to, an antenna system, an RF transceiver, at least one amplifier, a tuner, at least one oscillator, a digital signal processor, a CODEC chipset, a subscriber identity module (SIM) card, a memory, and the like. The RF circuit 131 may communicate with networks, such as the Internet, also referred to as the World Wide Web (WWW), an intranet and/or a wireless network, such as a cellular telephone network, a wireless local area network (WLAN) and/or a metropolitan area network (MAN), and with other devices by wireless communication. The wireless communication may include, but is not limited to, a Global System for Mobile Communications (GSM), an Enhanced Data GSM Environment (EDGE), a wideband code division multiple access (W-CDMA), a code division multiple access (CDMA), a time division multiple access (TDMA), a Bluetooth, a Wireless Fidelity (Wi-Fi) (e.g., IEEE 802.11a, IEEE 802.11b, IEEE 802.11g, IEEE 802.11n, IEEE 802.11ac, IEEE 802.11 ad, IEEE 802.11af, or IEEE 802.11hew), a voice over Internet protocol (VoIP), a Worldwide Interoperability for Microwave Access (WiMAX), long term evolution (LTE), LTE-advanced (LTE-A), a protocol for emails (e.g., an Internet message access protocol (IMAP) and/or a post office protocol (POP)), instant messaging (e.g., an extensible messaging and presence protocol (XMPP), Session Initiation Protocol for Instant Messaging and Presence Leveraging Extensions (SIMPLE), and/or an instant messaging and presence service (IMPS)), or short message service (SMS)), or communication protocols that are not yet developed as of the filing date of the present disclosure. Additionally, the wireless communication may use a plurality of communication standards, protocols, and technologies.

The audio circuit 132 provides an audio interface between a user and the portable device 200, using a speaker and/or a microphone. The audio circuit 132 may receive audio data from the peripheral interface 103, may convert the audio data to an electronic signal, and may transmit the electronic signal to the speaker. The speaker may convert the electronic signal to a human-audible sound wave. Additionally, the audio circuit 132 may receive an electronic signal converted by the microphone from a sound wave. The audio circuit 132 may convert the electronic signal to audio data, and may transmit the audio data to the peripheral interface 103 for processing. Audio data may be retrieved from or transmitted to the memory 102 or the RF circuit 131 by the peripheral interface 103. In an example, the audio circuit 132 may further include a headset jack. The headset jack may provide, for example, an interface between the audio circuit 132 and a mobile audio I/O peripheral device, for example, headphones for output or a headset with both output and input.

The power circuit 133 is connected to a battery, to supply power to a portion of or all of the components of the portable device 200. The power circuit 133 may include, for example, a power management system, at least one power source (for example, a battery, or an alternating current (AC)), a charging system, a power failure detection circuit, a power converter or inverter, a power status indicator, and other components for generation, management and distribution of power in the portable device 200.

In an example, the I/O subsystem 110 couples an I/O peripheral device to the peripheral interface 103. The I/O peripheral device may include, for example, the touch screen 121, the beam projector 122, the sensor 123, and the other input control devices 124. The I/O subsystem 110 may include a display controller 111, a sensor controller 112, or at least one other I/O controller 113. In an example, the touch screen 121, the beam projector 122, the sensor 123, or the other input control devices 124 may be coupled directly to the peripheral interface 103, instead of through the I/O subsystem 110.

In an example, at least one of the processor 101, the peripheral interface 103 and the PO subsystem 110 may be implemented on a single chip. In another example, a portion of at least one of the processor 101, the peripheral interface 103 and the PO subsystem 110 may be implemented on a single chip.

The display controller 111 may receive and/or transmit an electronic signal from and/or to the touch screen 121 including a touch-sensitive area. Based on control of the display controller 111, the touch screen 121 may display a visual output to the user. The visual output may include, for example, graphics, text, icons, video, audio, and an arbitrary combination thereof (hereinafter, collectively referred to as "graphics"). For example, a portion of or all of the visual output may correspond to a user interface (IA) that will be further described below.

For the touch screen 121, a liquid crystal display (LCD) technology a light emitting polymer display (LPD) technology, an organic light-emitting diode (OLED) technology, or an active-matrix organic light-emitting diode (AMOLED) technology may be used, however, there is no limitation thereto. Other display technologies may also be used for the touch screen 121. The touch screen 121 and the display controller 111 may use an arbitrary technology among touch sensing technologies that are already known or will be developed later. The touch sensing technologies may include, but not limited to, a capacitive technology, a resistive technology, an infrared technology, and a surface acoustic wave technology. Additionally the touch screen 121 and the display controller 111 may detect a contact, or a movement or breaking of the touch screen 121 and the display controller III, using other proximity sensor arrays, or other elements used to determine at least one point of contact with the touch screen 121.

The display controller 111 may be coupled to a screen that does not include a touch-sensitive area. The screen may receive an electronic signal from the display controller 111, and may display a visual and/or audio output to a user. For the screen, a plasma display panel (PDP) technology, an electronic paper display (EPD) technology, an LCD technology, an LPD technology, an OLED technology, or an AMOLED technology may be used, however, there is no limitation thereto. Other display technologies may also be used for the screen. For example, the portable device 200 employing a screen that does not include a touch-sensitive area may provide, as a UI for an operation, an I/O device, for example, a physical keyboard, a mouse, or a physical button.

The display controller 111 may transmit an electronic signal to the beam projector 122. Based on the control of the display controller 111, the beam projector 122 may display a visual output to a user. The visual output may include, for example, graphics. In an example, a portion of or all of the visual output may correspond to a UI that will be further described below.

The other I/O controller 113 may receive or transmit electronic signals from or to the other input control devices 124. The other input control devices 124 may include, for example, buttons, keyboards, touch pads, dials, slider switches, or joysticks. The other I/O controller 113 may be coupled to an arbitrary pointing device, for example, an infrared port, a universal serial bus (USB) port, or a mouse.

In an example, the other input control devices 124 may include at least one physical button or at least one virtual button. The virtual button and a virtual button controller may be a portion of the touch screen 121 and a portion of the display controller 111, respectively. A button may include, for example, an up and/or down button for volume control of a speaker or a microphone, a locker button, or a push button. For example, when a user briefly presses a push button, a lock of the touch screen 121 may be released, and a process of applying a gesture onto the touch screen 121 and unlocking the portable device 200 may be initiated. When the user long-presses the push button, the portable device 200 may be powered on or off. In another example, when the user presses the up and/or down button a screen displayed on the touch screen 121 may be scrolled up and/or down.

In another example, the other input control devices 124 may include at least one physical keyboard or at least one virtual soft keyboard. A keyboard may use, for example, standard (QWERTY) and/or non-standard configurations of symbols. The virtual soft keyboard and a virtual soft keyboard controller may be a portion of the touch screen 121 and a portion of the display controller 111, respectively. A number of graphics or soft keys in the virtual soft keyboard may be less than a number of keys in the physical keyboard. For example, when a user selects at least one graphics of the virtual soft keyboard, at least one corresponding symbol may be displayed on the touch screen 121.

In still another example, the other input control devices 124 may include a touch pad to activate or deactivate a predetermined function. The touch pad may include a touch-sensitive area on which a visual output is not displayed, unlike a touch screen. Additionally the touch pad may be, for example, a touch-sensitive surface separated from a touch screen, or a portion of a touch-sensitive surface formed and extended by the touch screen.

The sensor 123 may include, but is not limited to, different types of sensors, for example, an optical sensor, a proximity sensor, an image sensor, an acceleration sensor, a global positioning system (GPS) sensor, a magnetic sensor, a tilt sensor, an environment sensor, or a weather sensor. Additionally, the sensor 123 may further include an electromyogram (EMG) sensor, or a motion sensor.

Figure 2:
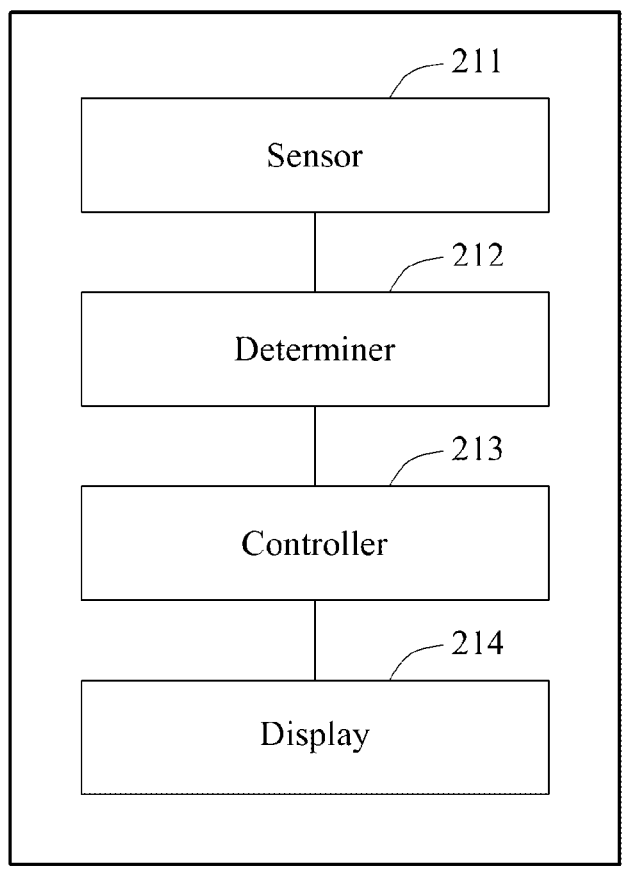
FIG. 2 illustrates an example of a portable device controlled using a virtual input area.

FIG. 2 illustrates an example of a portable device 200-1 controlled using a virtual input area.

Referring to FIG. 2, the portable device 200-1 includes a sensor 211, a determiner 212, and a controller 213. The portable device 200-1 may further include a display 214. Although FIG. 2 illustrates the portable device 200-1 including the sensor 211, the determiner 212 and the controller 213, the sensor 211, the determiner 212 and the controller 213 may also be implemented as independent hardware. The portable device 200-1 is an example of the portable device 200 of FIG. 1. The sensor 211, the determiner 212, the controller 213 and the display 214 may be implemented, for example, by a combination of at least one component or at least two components of the portable device 200.

The sensor 211 senses a user input to an input area. The sensor 211 may include sensors in a sensor array, and a sensor controller. The sensor controller may be connected to the sensors, to perform signal processing of the sensed user input and to control the sensors. The signal processing may include, for example, noise filtering of signals received from the sensors. The user input may include, for example, a tap input, a touch-and-hold input, a double tap input, a drag input, a panning input, a flick input, a drag-and-drop input, a swipe input, and a pinch input that may be performed by a user on the input area. The user input may further include audio input, such as a spoken command.

The sensor array may include a plurality of distance/proximity array sensors, or may be implemented, for example, as a line type sensor. Additionally, the sensor array may be designed in a structure of a plurality of layers. For example, when the sensor array is designed in a structure of a plurality of layers, a three-dimensional (3D) position with x-, y-, and z-axes as well as a two-dimensional (2D) position with x- and y-axes may be sensed.

In an example, the sensor array may include a plurality of ultrasonic sensors. In this example, when a position of a finger is found using the ultrasonic sensors, the sensor array may transmit and receive ultrasonic pulses, may measure a period of time in which the ultrasonic pulses travel using a triangulation scheme of an arrival time of the ultrasonic pulses, and may calculate the position of the finger. By using a ultrasonic sensor array it is possible to achieve low power, and to avoid an influence by an illumination environment, for example the sun.

In another example, the sensor array may include a 3D sensor in a form of a line. When the 3D sensor is used, the sensor array may have a high resolution on an input area, for example, a back of a user's hand. Accordingly the sensor array may be utilized for a precise pattern recognition (for example, a character recognition). The input area may refer to an area adjacent to a wearable device.

In still another example, the sensor array may include a dynamic vision sensor (DVS). When the DVS is used, the sensor array may be driven with ultra low power, and may sense a fast movement in an always-on state.

In yet another example, the sensor array may include a plurality of infrared ray (IR) sensors. When signals are transmitted from the IR sensors, an intensity of being in contact with a finger may be measured, and a position of the finger may be calculated. Additionally, a 2D position of the finger on an input area, that is, an area adjacent to a wearable device may be detected.

In the above example, the wearable device worn on a wrist is described, however, there is no limitation thereto. For example, the wearable device may be worn on an arm, using an arm band. In this example, it is possible to detect a user input to an input area, i.e., an area adjacent to the wearable device, from the arm as well as the wrist.

The input area refers to a virtual area to sense a user input. The input area will be further described with reference to FIGS. 3, 4A, 4B and 4C.

Figure 3:
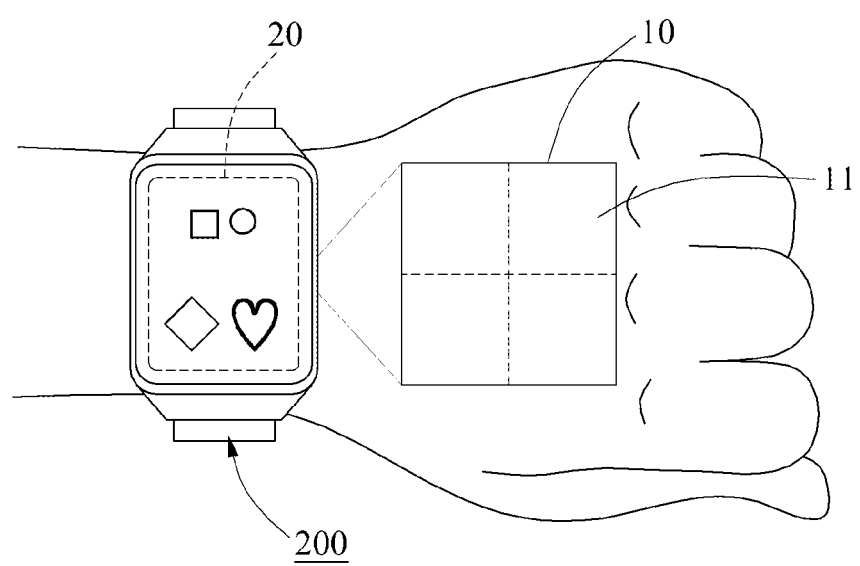
FIG. 3 illustrates an example of an input area and input objects.

FIG. 3 illustrates an example of an input area and input objects. In an example, FIG. 3, illustrates the input area 10 and the input objects 20 displayed on the portable device 200 of FIG. 1. The input area 10 may refer to at least a portion of an area adjacent to the portable device 200. A user may control the portable device 200 by performing a user input to the input area 10.

The input area 10 may be divided into a plurality of cells 11. The cells 11 may respectively correspond to input objects 20. An arrangement of the input objects 20 may include a number of the input objects 20 and positions of the input objects 20. For example, when the input objects 20 are arranged in 2 rows and 2 columns (hereinafter, represented by "2×2"), the input area 10 may be divided into 2×2 cells 11, as shown in FIG. 3. In other words, the input area 10 may be divided into A×B cells 11, based on an arrangement of the input objects 20 in A×B, and A and B are natural numbers. A number of the cells 11 may be equal to the number of the input objects 20.

The input objects 20 refer to objects to receive a user input. The input objects 20 may be objects selectable by a user, for example, icons, lists, buttons, pictures, characters, symbols, and the like. The input objects 20 may be objects in an activated state. For example, when a "display settings" menu is activated by selecting the "display settings" menu from a "settings" menu, and when the "display settings" menu is superimposed on the "settings" menu, objects of the "display settings" menu may correspond to the input objects 20.

Figure 4A:
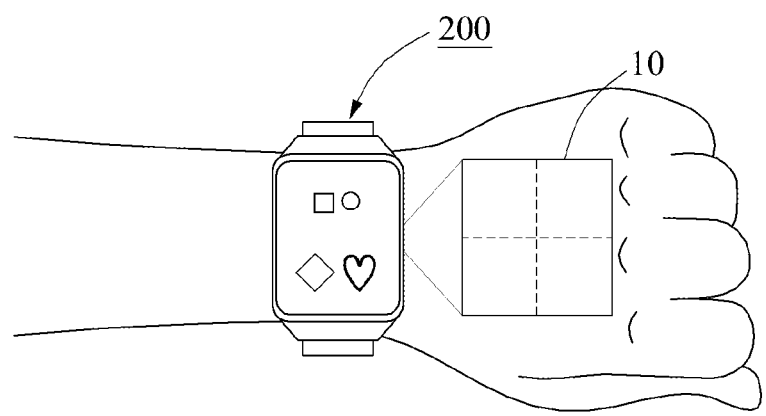
FIGS. 4A through 4C illustrate examples of a position of an input area.
Figure 4B:
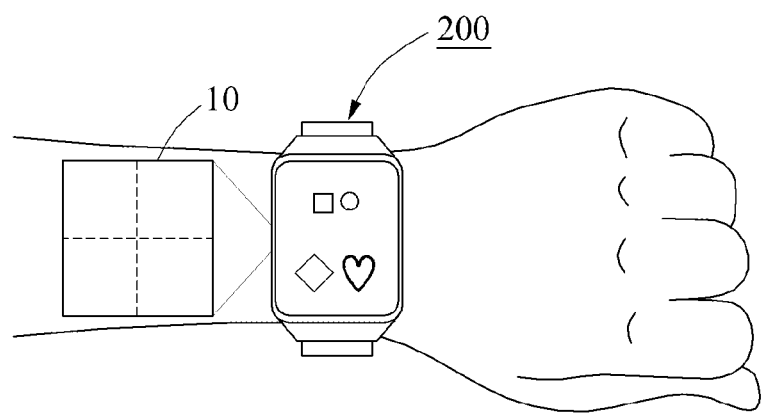
Figure 4C:
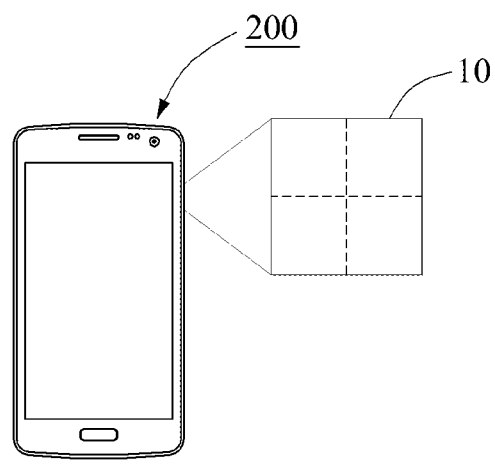

FIGS. 4A through 4C illustrate examples of a position of an input area. As shown in FIGS. 4A through 4C, the input area 10 may be located in a back of a user's hand, a user's wrist, and an area adjacent to the portable device 200 of FIG. 1. The above positions are merely examples, and the input area 10 may be located in an area adjacent to the portable device 200 that is not illustrated in FIGS. 4A through 4C, for example, a palm or a finger.

Referring back to FIG. 2, the determiner 212 may determine a target object corresponding to the user input among at least one input object displayed on the portable device 200-1, based on an arrangement of the at least one input object. An example of the target object is shown in FIG. 5B. Hereinafter, an operation of the determiner 212 will be further described with reference to FIGS. 5A through 5C and 6A through 6C.

FIGS. 5A through 5C and 6A through 6C illustrate examples of a divided input area.

Figure 5A:
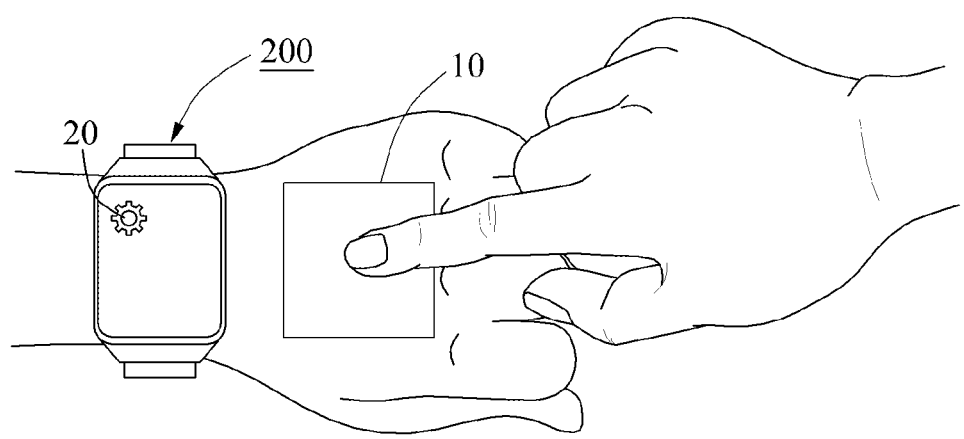
FIGS. 5A through 5C and 6A through 6C illustrate examples of a divided input area.
Figure 5B:
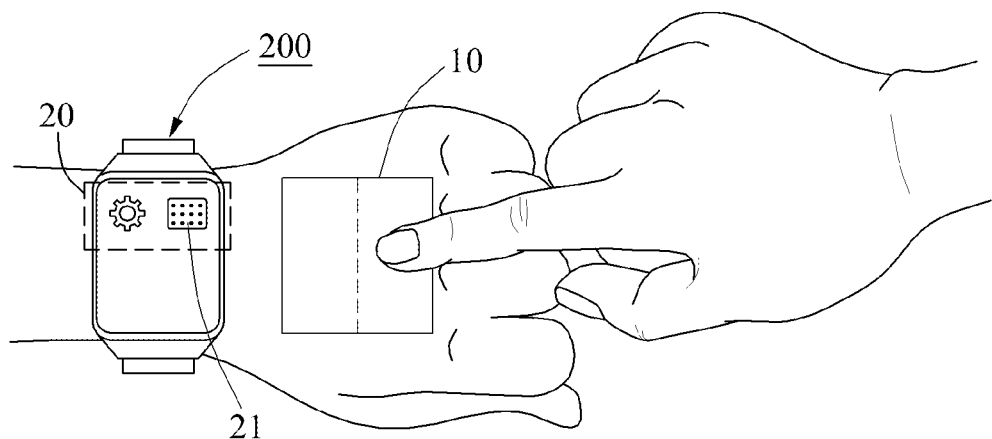

FIG. 5A illustrates an input area 10 and a single input object 20. The input area 10 may not be divided into a plurality of cells. A user may select at least a portion of the input area 10, to select the input object 20.

FIG. 5B illustrates an input area 10 in an example in which two input objects 20 are arranged in a 1×2 array. In this example, the input area 10 may be divided into a plurality of cells in 1×2. A user may select one of the cells, to select one of the input objects 20. An object selected by the user is defined as a target object 21. When the user selects a right cell from among the cells, the input object 20 on a right side between the input objects 20 may correspond to the target object 21.

When a number of columns is different from a number of rows, the cells may have a vertically long shape, or a horizontally long shape, as shown in FIG. 5B. The user may select the target object 21 by selecting at least a portion of the cells.

Figure 5C:
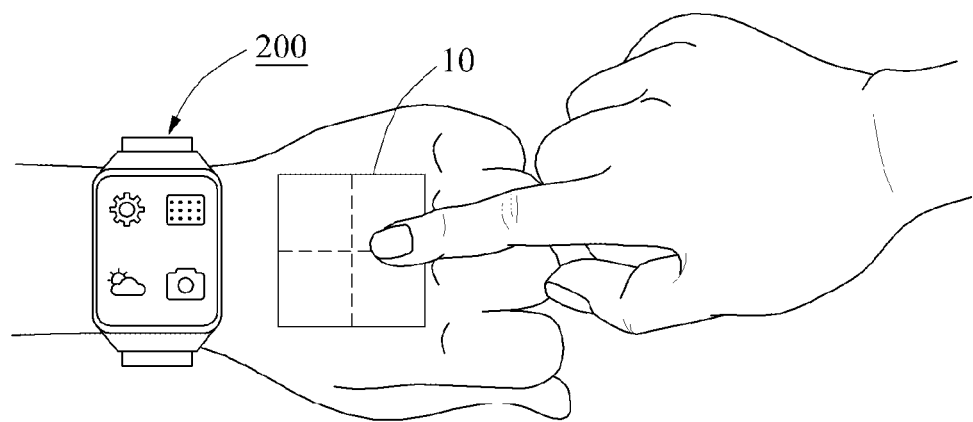
Figure 6A:
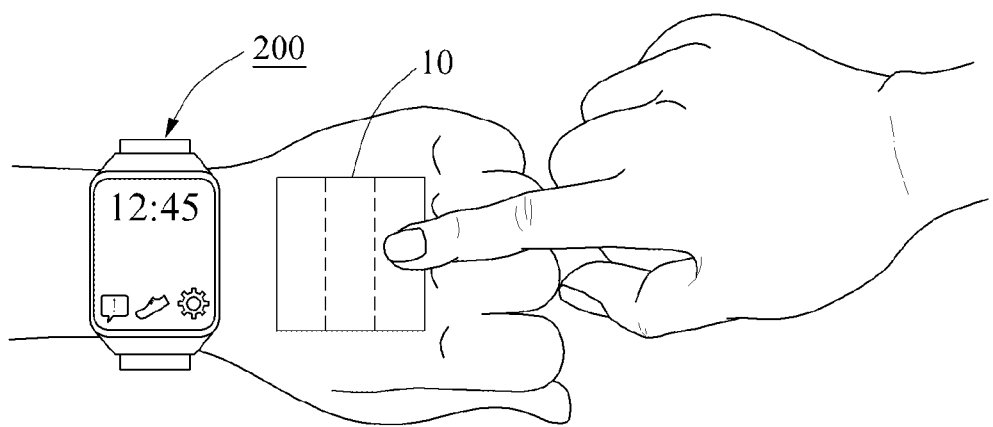
Figure 6B:
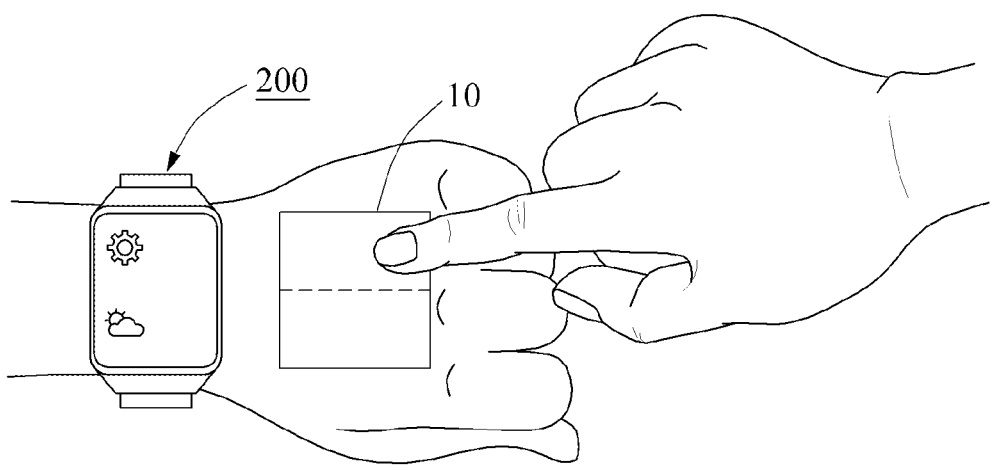
Figure 6C:
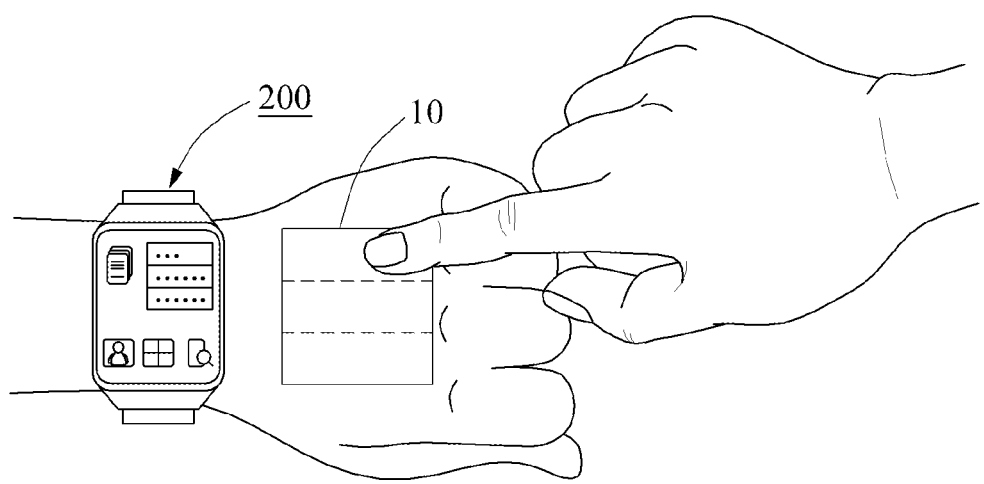

FIG. 5C illustrates an input area 10 in an example in which four input objects 20 are arranged in a 2×2 array. FIG. 6A illustrates an input area 10 in an example in which input objects 20 are arranged in a 1×3 array. FIG. 6B illustrates an input area 10 in an example in which input objects 20 are arranged in a 2×1 array. FIG. 6C illustrates an input area 10 in an example in which input objects 20 are arranged in a 3×1 array. As described above, the input object 20 may include a list, as shown in FIG. 6C, and the user may select the target object 21 by selecting at least a portion of the cells.

Referring back to FIG. 2, the determiner 212 may map a position of the user input to the input area and a position of a target object in the arrangement of the at least one input object, and may determine the target object. For example, when a user selects a right cell from 1×2 cells, the determiner 212 may determine a right input object between input objects arranged in 1×2 as a target object.

The determiner 212 may divide the input area into a plurality of cells, based on a number of the at least one input object, and may determine the target object based on a cell in which the user input is sensed among the cells. For example, when three input objects exist, the input area may be divided into three cells, and a cell in which a user input is sensed among the three cells may be determined as a target object.

The controller 213 generates a control command to control the target object. The control command may be generated based on a type of user inputs. As described above, the user input may include, for example, a tap input, a touch-and-hold input, a double tap input, a drag input, a panning input, a flick input, a drag-and-drop input, a swipe input, and a pinch input that may be performed by a user on the input area. As an alternative, the user input may include a voice or audio input. In an example, when a user input is a tap input, a control command may be a command to select a target object. In another example, when a user input is a drag input, a control command may be a command to move a target object.

When an operation is set in advance for a user input, the controller 213 may generate a control command to control the target object, based on the set operation. For example, when a drag input for dragging a call answer object from left to right is mapped to a call answering operation, the controller 213 may generate a command to answer a call, in response to the drag input. The drag input will be further described with reference to FIGS. 7A and 7B.

Figure 7A:
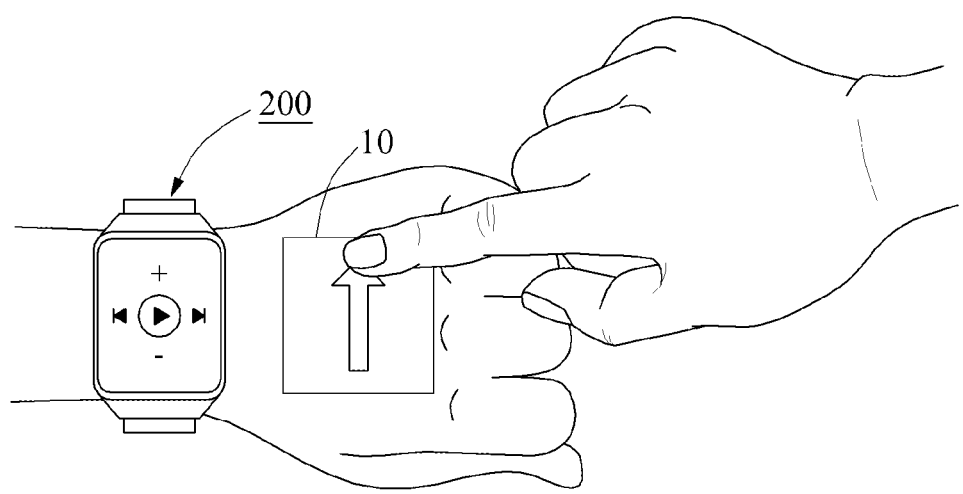
FIGS. 7A and 7B illustrate examples of a drag input.
Figure 7B:
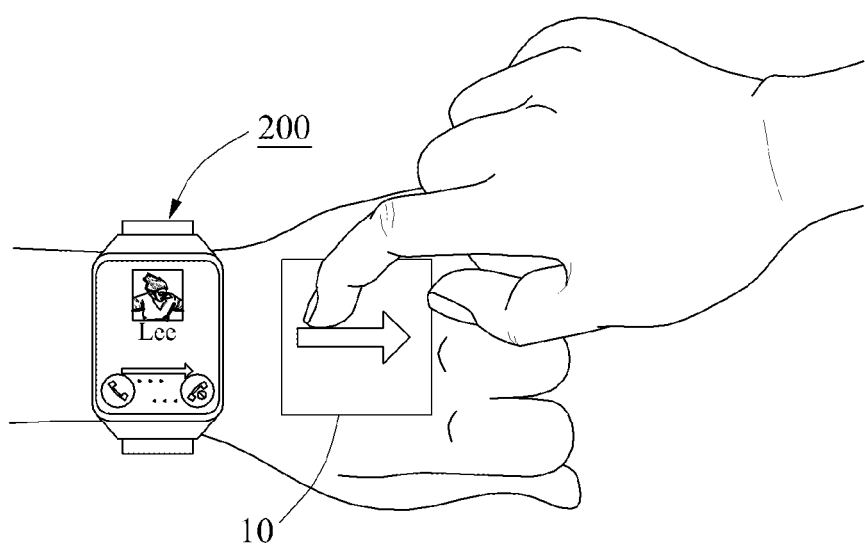

FIGS. 7A and 7B illustrate examples of a drag input.

FIGS. 7A and 7B illustrate a vertical drag input and a horizontal drag input to the portable device 200 of FIG. 1, respectively.

As described above, a user input may include a drag input. The controller 213 of FIG. 2 may generate a command to move the target object, in response to a drag input of a user. Additionally, when an operation is mapped in advance to the drag input, the controller 213 may generate a control command to control the mapped operation, in response to the drag input.

The controller 213 may generate a drag command to drag the target object, in response to the user input being a drag input for dragging the input area from a first point to a second point. The input area may be a single area, instead of being divided into cells. The drag input may be, for example, an input to a single area from a first point to a second point.

FIG. 7A illustrates the portable device 200 by which music is played back, and a drag input to an input area 10. A user may perform a drag input from one area to another area of the input area 10, such as for example from bottom to top on the input area 10. In response to the drag input, the controller 213 may generate a selection command for a volume control object. For example, a control command for a volume control object may be mapped to a vertical drag input, and a control command for a music change object may be mapped to a horizontal drag input.

FIG. 7B illustrates the portable device 200 to which an incoming call is received, and a drag input to an input area 10. A user may perform a drag input from one area to another area of the input area 10, such as from left to right on the input area 10. In response to the drag input, the controller 213 may generate a drag command for a call answer object. For example, a control command for a call answer object may be mapped to a drag input from left to right, and a control command for a call rejection object may be mapped to a drag input from right to left.

Referring back to FIG. 2, the controller 213 may change the arrangement of the at least one input object, based on a width of an input tool for a user input. The above change will be further described with reference to FIGS. 8A and 8B.

Figure 8A:
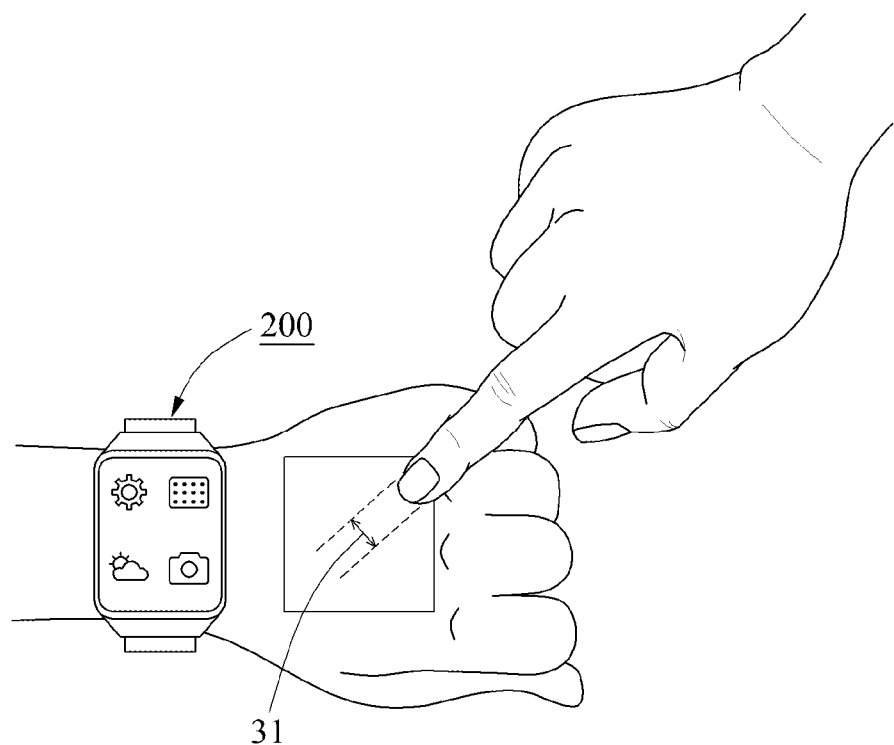
FIGS. 8A and 8B illustrate examples of control of input objects based on a width of an input tool for a user input.
Figure 8B:
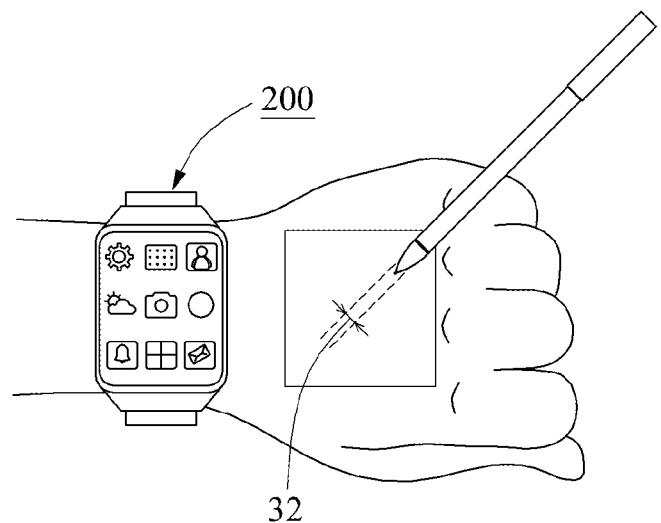

FIGS. 8A and 8B illustrate examples of control of input objects based on a width of an input tool for a user input.

FIG. 8A illustrates an example of an arrangement of input objects, in response to a user input being performed using a finger of a user. FIG. 8B illustrates an example of an arrangement of input objects, in response to a user input being performed using a stylus pen.

The sensor 211 may sense the width of the input tool based on a size of an area in which a user input is sensed. The input tool may be, for example, a user's finger, or a stylus pen. However, it is noted that the input tool is not limited thereto and other objects may be used as the input tool. The width of the input tool may be, for example, a thickness of the input tool.

The controller 213 may change an arrangement of at least one input object, based on the width of the input tool. The controller 213 may control a number of input objects to be inversely proportional to the width of the input tool. For example, the controller 213 may increase the number of input objects, based on a narrow width 32 of the stylus pen of FIG. 8B, in comparison to a wide width 31 of the user's finger of FIG. 8A.

Referring back to FIG. 2, the display 214 may display the at least one input object. The display 214 may display the input object, based on the control command of the controller 213. The controller 213 may display a cursor corresponding to a position of an input tool for the user input on the display 214. The cursor will be further described with reference to FIGS. 9A and 9B.

Figure 9A:
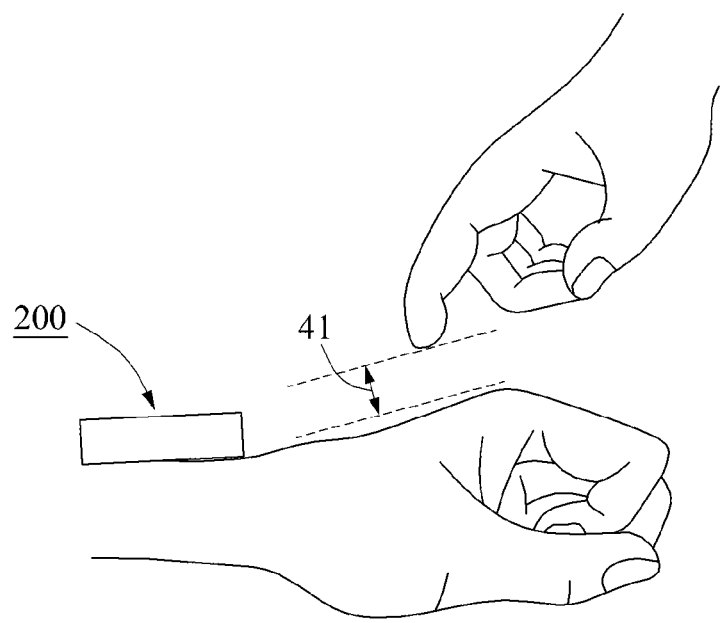
FIGS. 9A and 9B illustrate an example of a hovering state, and an example of a cursor corresponding to a position of an input tool for a user input.
Figure 9B:
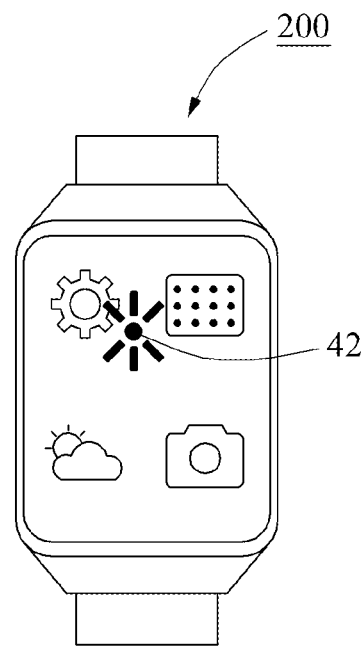

FIGS. 9A and 9B illustrate an example of a hovering state, and an example of a cursor corresponding to a position of an input tool for a user input.

FIG. 9A illustrates an example of a hovering state, and FIG. 9B illustrates an example of a screen of the portable device 200 of FIG. 1 based on the hovering state.

The hovering state refers to a state in which an input tool for a user input is located within a proximity range 41. In the hovering state as shown in FIG. 9A, a user's finger is located within a proximity range 41 from a back of a user's hand when a user performs a user input using the finger. Additionally, in the hovering state, the finger may not be in contact with the back of the user's hand. It is noted that although FIG. 9A illustrates a user's finger as the input tool, the example is not limited thereto and other input tools may be used, such as for example a stylus.

The controller 213 may display, on the display 214, a cursor 42 corresponding to a position of the input tool, in response to the sensed input tool being in the proximity range 41. The controller 213 may move the cursor 42, based on a movement of the input tool. The user may accurately perform the user input, using the cursor 42.

Figure 10:
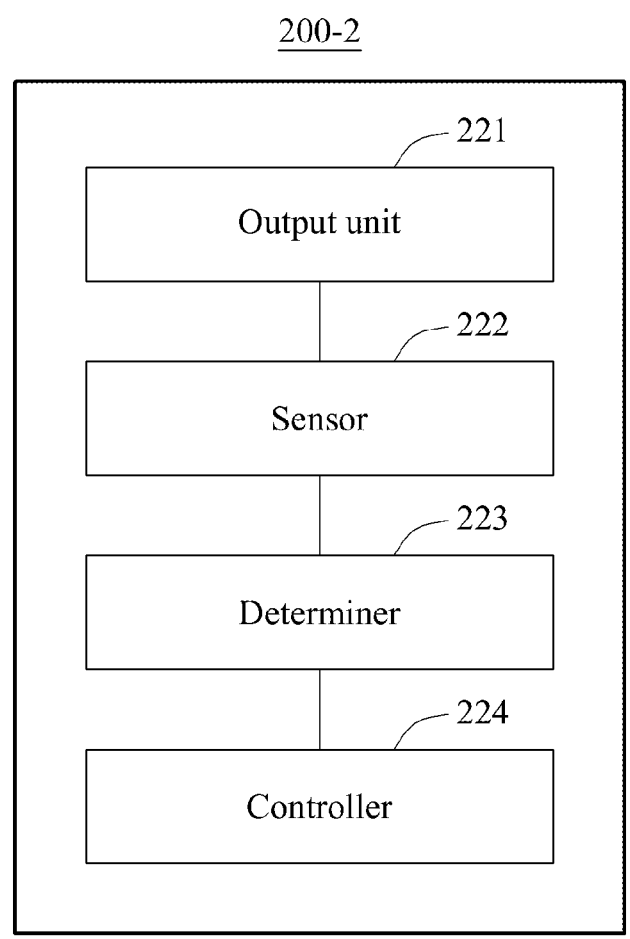
FIG. 10 illustrates an example of a portable device for outputting an input object to a virtual input area.

FIG. 10 illustrates an example of a portable device for outputting an input object to a virtual input area.

The portable device 200-2 of FIG. 10 includes an output unit 221, a sensor 222, a determiner 223, and a controller 224.

The output unit 221 outputs at least one input object to an input area, that is, at least a portion of an area adjacent to the portable device 200-2. The output unit 221 may use the beam projector 122 of FIG. 1 to output the at least one input object to the input area. The portable device 200-2 may include, for example, the beam projector 122, instead of the touch screen 121 of FIG. 1.

The sensor 222 senses a user input to the input area. The sensor 222 may include sensors in a sensor array, and a sensor controller. The sensor controller may be connected to the sensors, to perform signal processing of the sensed user input and to control the sensors. The signal processing may include noise filtering of signals received from the sensors. The user input may include, for example, a tap input, a touch-and-hold input, a double tap input, a drag input, a panning input, a flick input, a drag-and-drop input, a swipe input, and a pinch input that may be performed by a user on the input area. Additionally, the user input may include a voice input.

The determiner 223 determines a target object corresponding to the user input among the at least one input object. In an example, the determiner 223 may determine a target object among at least one input object displayed on the portable device 200-2, based on an arrangement of the at least one input object. In another example, the determiner 223 may determine a target object by mapping a position of a user input to the input area and a position of the target object in an arrangement of the at least one input object. In still another example, the determiner 223 may divide the input area into cells, based on a number of at least one input object, and may determine a target object, based on a cell in which a user input is sensed among the cells.

The controller 224 generates a control command to control the target object. The control command may be generated based on a type of user inputs. As described above, the user input may include, for example, a tap input, a touch-and-hold input, a double tap input, a drag input, a panning input, a flick input, a drag-and-drop input, a swipe input, and a pinch input that may be performed by a user on the input area. In an example, when a user input is a tap input, the control command may be a command to select the target object. In another example, when a user input is a drag input, the control command may be a command to move the target object.

The controller 224 changes the arrangement of the at least one input object, based on an angular factor representing an angle of a user's wrist. The above change will be further described with reference to FIGS. 11, 12A and 12B.

Figure 11:
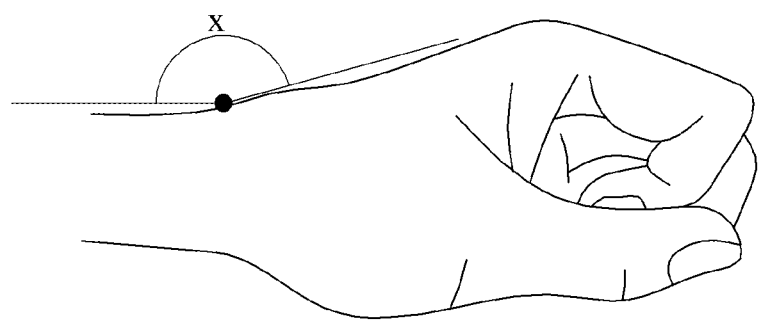
FIG. 11 illustrates an example of an angular factor.

FIG. 11 illustrates an example of an angular factor.

Referring to FIG. 11, the angular factor X represents an angle of a user's wrist. The angular factor X may be defined as an angle between the wrist and a back of a user's hand. For example, when the wrist is bent upward while the back of the hand is facing upward, the angular factor X may decrease. In this example, when the wrist is bent downward, the angular factor X may increase.

In an example, the determiner 223 of FIG. 10 may determine the angular factor X, based on an intensity of light reflected from an input area. When the angular factor X decreases, a distance between the back of the user's hand and the portable device 200-2 of FIG. 10 may decrease, which may increase an amount of the reflected light. When the angular factor X increases, the distance may increase, which may reduce the amount of the reflected light. Accordingly, the determiner 223 may determine the angular factor X so that the angular factor X may be inversely proportional to the amount of the reflected light.

In another example, the determiner 223 may determine the angular factor X, based on a shape of the input area. When the angular factor X decreases, a size of the input area sensed by an image sensor may increase. Accordingly, the determiner 223 may determine the angular factor X so that the angular factor X may be inversely proportional to the size of the input area. The determiner 223 may determine the angular factor X, based on an output of the image sensor.

In still another example, the determiner 223 may determine the angular factor X, based on a degree of proximity of the back of the user's band to an image sensor. The determiner 223 may determine the degree of proximity, based on an output of a proximity sensor. The determiner 223 may determine the angular factor X so that the angular factor X may be inversely proportional to the degree of proximity.

Figure 12A:
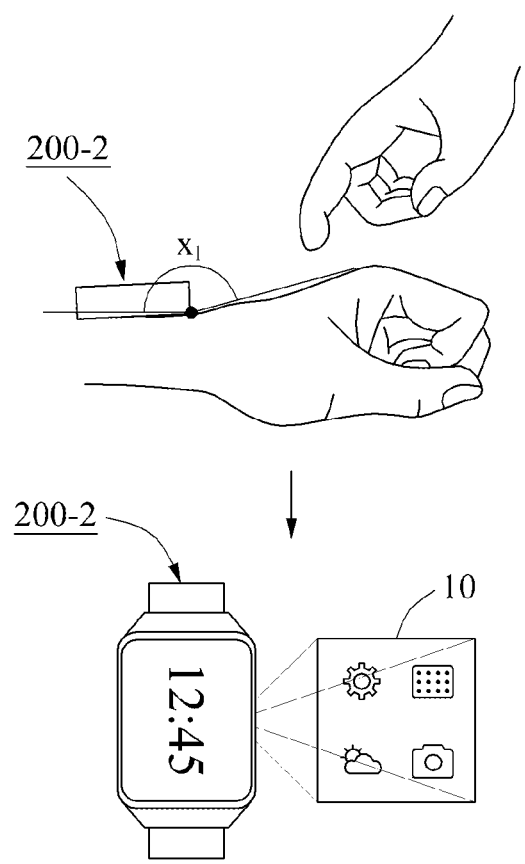
FIGS. 12A and 12B illustrate examples of control of input objects based on an angular factor.
Figure 12B:
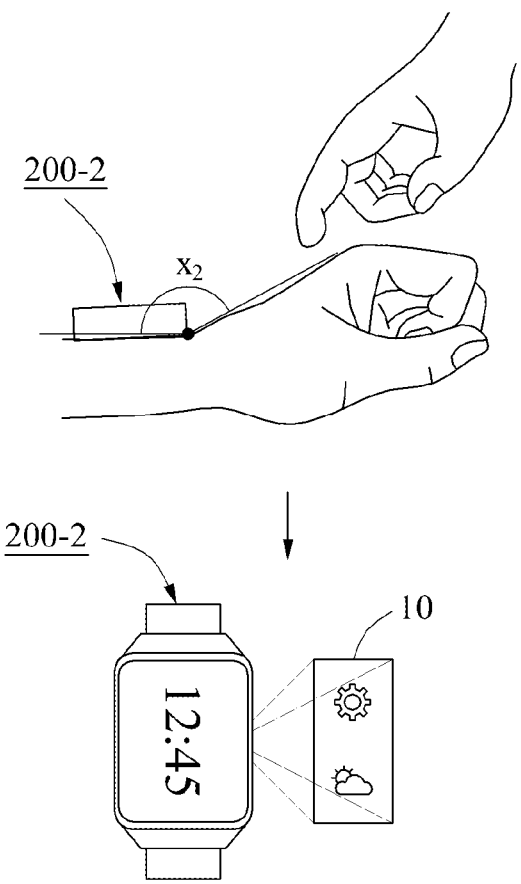

FIGS. 12A and 12B illustrate examples of control of input objects based on an angular factor.

FIG. 12A illustrates an arrangement of input objects output to an input area 10 in an example of an angular factor X1. FIG. 12B illustrates an arrangement of input objects output to an input area 10 in an example of an angular factor X2.

The controller 224 of FIG. 10 may change a number of the input objects output to the input area 10, based on an angular factor. Referring to FIGS. 12A and 12B, the angular factor X1 is greater than the angular factor X2. For example, when an angular factor is equal to or less than 180 degrees, the input area may be widened, and a number of input objects output to the input area may increase, based on an increase in the angular factor. In other words, when the angular factor is equal to or less than 180 degrees, the controller 224 may increase the number of input objects output to the input area, in proportion to the angular factor.

In FIG. 12A, the controller 224 may control the output unit 221 to output four input objects arranged in 2×2 to the input area 10. In FIG. 12B the controller 224 may control the output unit 221 to output two input objects arranged in 2×1 to the input area 10. The determiner 223 of FIG. 10 may compare a size of the input area 10 to a size of each of the input objects, and may determine a number of input objects to be output to the input area 10.

Referring back to FIG. 10, the controller 224 may generate a drag command to drag a target object, in response to the user input being a drag input for dragging the input area from one point to another point. The drag input is further described with reference to FIG. 13.

Figure 13:
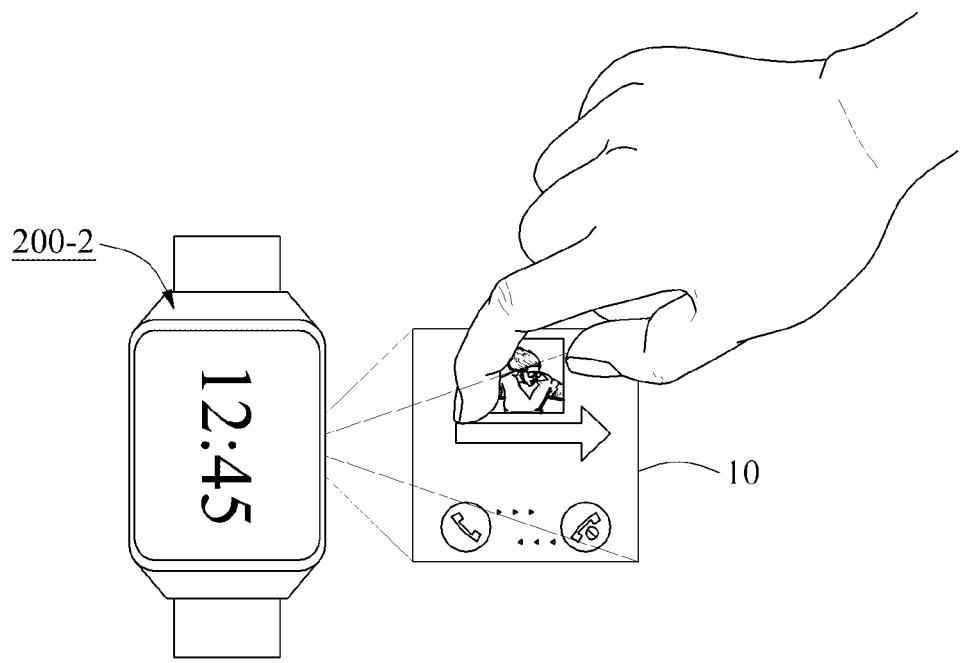
FIG. 13 illustrates another example of a drag input.

FIG. 13 illustrates another example of a drag input.

Referring to FIG. 13, a user drags an input area 10 to which the portable device 200-2 outputs input objects.

The controller 224 of FIG. 10 may generate a drag command to drag a target object, in response to the user input being a drag input for dragging the input area from a first point to a second point. The input area may be a single area, not divided into cells. The drag input may be, for example, an input to a single area from one point to another point. When an operation is set in advance for a user input, the controller 224 may generate a control command to control the target object, based on the set operation. In FIG. 13, the controller 224 may generate a drag command to drag a call answer object, based on a drag input from one point to the right, that is, to another point.

Figure 14:
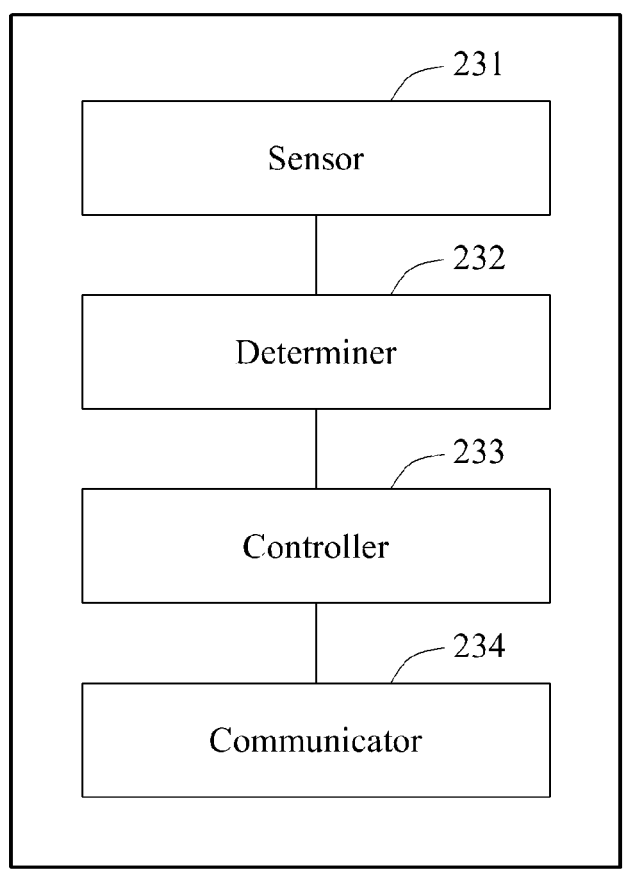
FIG. 14 illustrates an example of a portable device for controlling an external device using a virtual input area.

FIG. 14 illustrates an example of a portable device for controlling an external device using a virtual input area.

Referring to FIG. 14, the portable device 200-3 includes a sensor 231, a determiner 232, a controller 233, and a communicator 234. The portable devices 200-1 through 200-3 are examples of the portable device 200 and accordingly, the above-description of the portable device 200 may be applicable to the portable devices 200-1 through 200-3.

The sensor 231 senses a user input to an input area that is at least a portion of an area adjacent to the portable device 200-3. The sensor 231 may include sensors in a sensor array, and a sensor controller. The sensor controller may be connected to the sensors, to perform signal processing of the sensed user input and to control the sensors. The signal processing may include, for example, noise filtering of signals received from the sensors. The user input may include, for example, a tap input, a touch-and-hold input, a double tap input, a drag input, a panning input, a flick input, a drag-and-drop input, a swipe input, and a pinch input that may be performed by a user on the input area. In addition, the user input may include a voice command.

The determiner 232 determines a target object corresponding to the user input among at least one input object displayed on an external device, based on an arrangement of the at least one input object. The external device may be distinguished from the portable device 200-3. The determiner 232 may map a position of the user input to the input area and a position of a target object in the arrangement of the at least one input object, and may determine the target object. The determiner 232 may divide the input area into a plurality of cells, based on a number of the at least one input object, and may determine a target object based on a cell in which the user input is sensed among the cells. Because the portable device 200-3 may control an input object displayed on the external device, the touch screen 121 may not be included in the portable device 200-3.

The controller 233 generates a control command to control the target object. The control command may be generated based on a type of user inputs. As described above, the user input may include, for example, a tap input, a touch-and-hold input, a double tap input, a drag input, a panning input, a flick input, a drag-and-drop input, a swipe input, and a pinch input that may be performed by a user on the input area. In an example, when a user input is a tap input, a control command may be a command to select a target object. In another example, when a user input is a drag input, a control command may be a command to move a target object. When an operation is set in advance for a user input, the controller 233 may generate a control command to control the target object, based on the set operation.

The communicator 234 transmits the control command to the external device. The communicator 234 receives screen information from the external device. The screen information may include, for example, information on the arrangement of the at least one object displayed on the external device. Additionally, the communicator 234 transmits and receives authentication information to and from the external device, for connection to the external device. A process of controlling the external device using the portable device 200-3 will be further described with reference to FIGS. 15A, 15B, 16A and 16B.

FIGS. 15A, 15B, 16A and 16B illustrate examples of control of an external device.

Figure 15A:
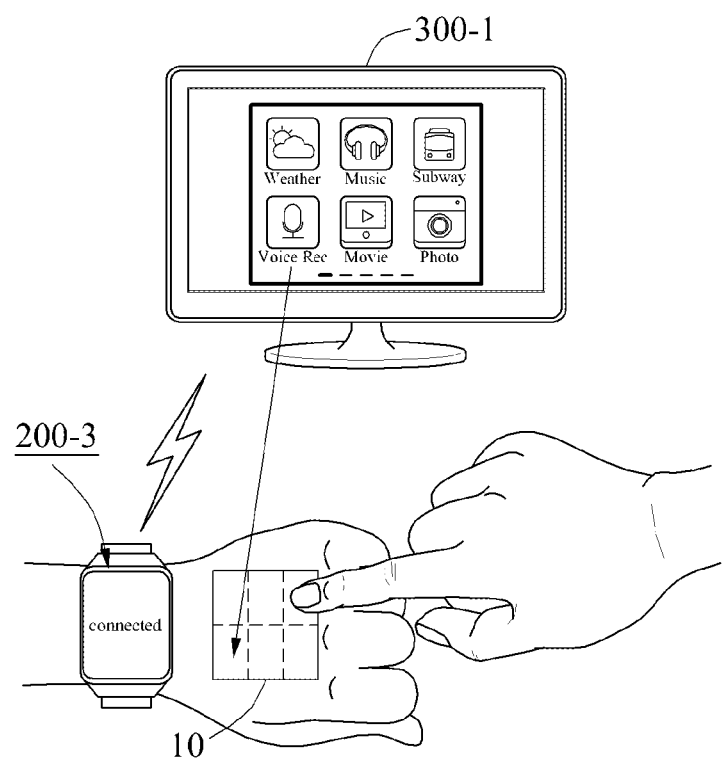
FIGS. 15A, 15B, 16A and 16B illustrate examples of control of an external device.
Figure 15B:
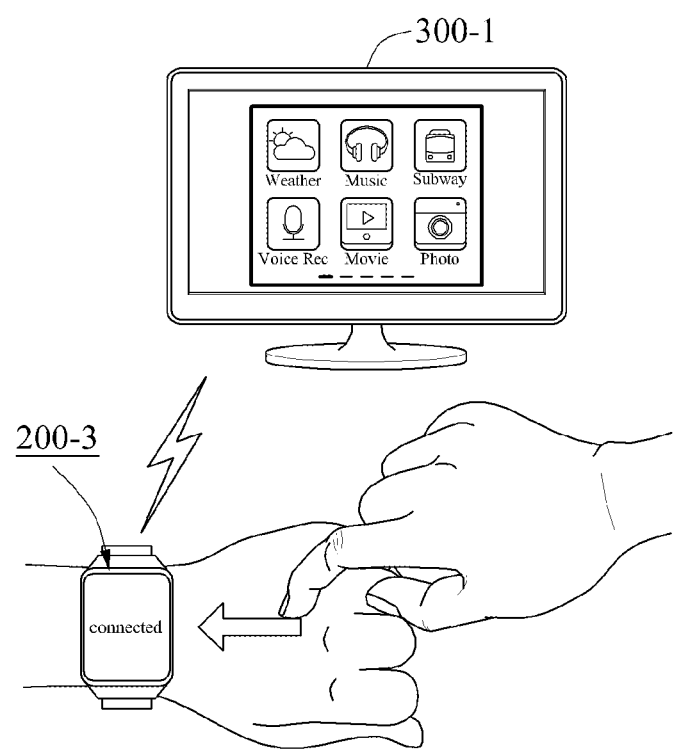
Figure 16A:
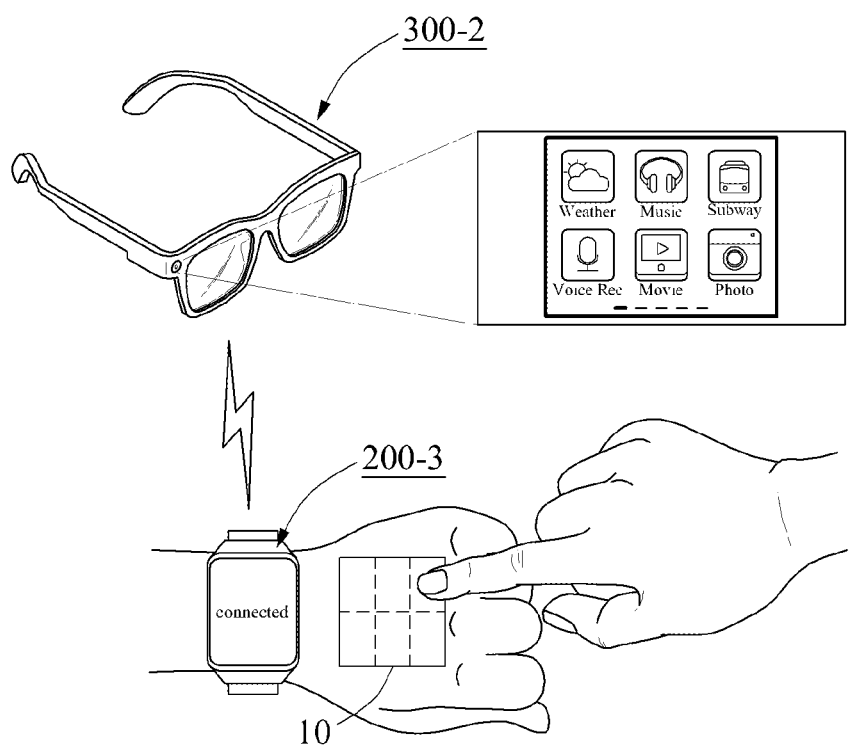
Figure 16B:
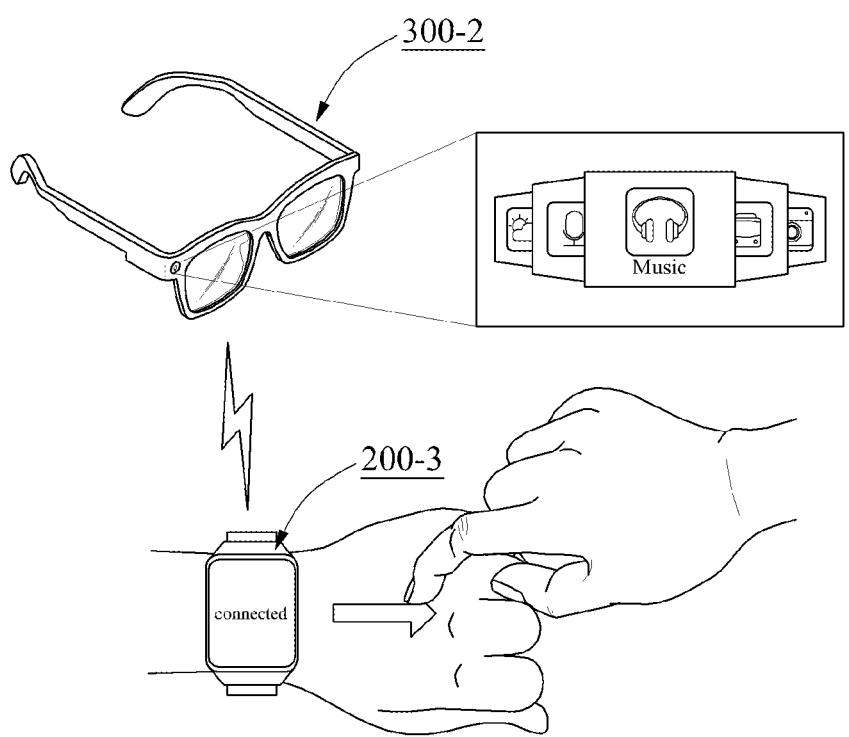

FIGS. 15A, 15B, 15C and 16B illustrate control processes of external devices 300-1 and 300-2 using the portable device 200-3 of FIG. 14, respectively. FIGS. 15A and 15B illustrate a smart TV as an example of the external device 300-1, and FIGS. 16A and 16B illustrate smart glasses as an example of the external device 300-2.

In FIG. 15A, an input area 10 is divided into a plurality of cells based on an arrangement of input objects displayed on the external device 300-1. A user may select one of the input objects by selecting one of the cells. The external device 300-1 may process the input object, based on a selection command received from the portable device 200-3.

In FIG. 15B, a user may perform a drag input, to transmit a drag command to the external device 300-1. The external device 300-1 may process an input object, based on the drag command received from the portable device 200-3. For example, based on the drag command, the external device 300-1 may change a channel or control a volume.

In FIG. 16A, an input area 10 is divided into a plurality of cells based on an arrangement of input objects displayed on the external device 300-2. A user may select one of the input objects by selecting one of the cells. The external device 300-2 may process the input object, based on a selection command received from the portable device 200-3.

In FIG. 16B, a user may perform a drag input, to transmit a drag command to the external device 300-2. The external device 300-2 may process an input object, based on the drag command received from the portable device 200-3. For example, based on the drag command, the external device 300-2 may drag a web page or a settings menu.

Figure 17:
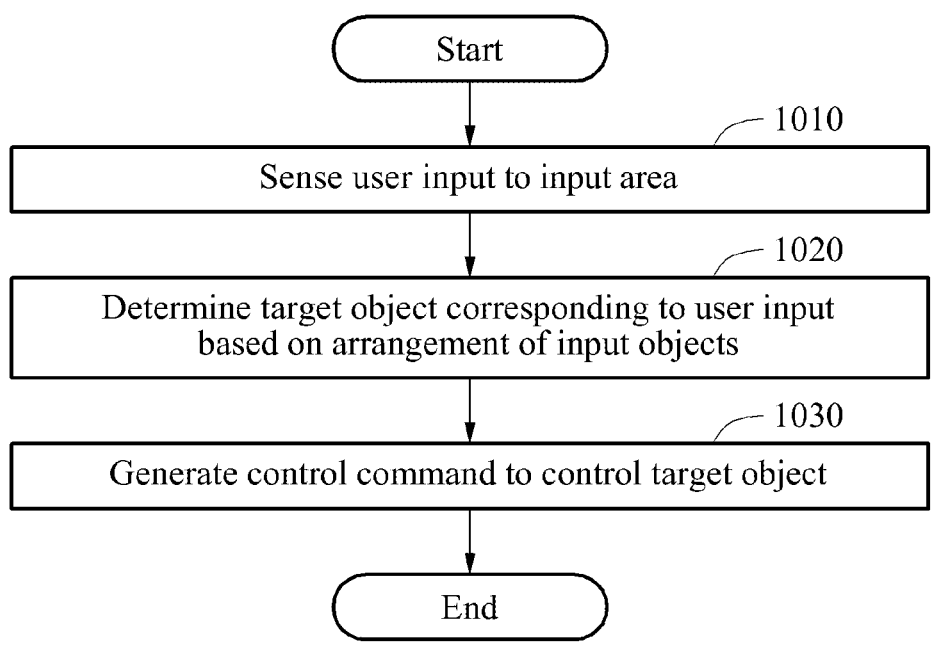
FIG. 17 illustrates an example of an operating method of a portable device.

FIG. 17 illustrates an example of an operating method of a portable device.

Referring to FIG. 17, in operation 1010, the portable device senses a user input to an input area.

In operation 1020, the portable device determines a target object corresponding to the user input, based on an arrangement of input objects.

In operation 1030, the portable device generates a control command to control the target object.

The above-described operations of the portable device 200 of FIG. 1 may be applicable to operations 1010 through 1030 of FIG. 17.

The various components of the portable device 200 described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, and optical data storage devices.

Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A portable device, comprising:
a sensor configured to sense a user input to an input area, the input area being at least a portion of an area adjacent to the portable device;
a determiner configured to determine a target object corresponding to the user input among at least one input object displayed on the portable device, based on an arrangement of the at least one input object; and
a controller configured to generate a control command to control the target object,
wherein the determiner is further configured to divide the input area into a plurality of cells, based on a number of the at least one input object, and to determine the target object, based on a cell in which the user input is sensed among the plurality of cells.

2. The portable device of claim 1, wherein the determiner is further configured to map a position of the user input to the input area and a position of the target object in the arrangement of the at least one input object, and to determine the target object.

3. The portable device of claim 1, wherein the determiner is further configured to divide the input area into cells with A rows and B columns, in response to the at least one input object being arranged in the A rows and the B columns, and to determine the target object, based on a cell in which the user input is sensed among the cells, A and B being natural numbers.

4. The portable device of claim 1, further comprising:
a display configured to display the at least one input object,
wherein the controller is further configured to display a cursor corresponding to a position of an input tool for the user input on the display.

5. The portable device of claim 1, wherein the controller is further configured to change the arrangement of the at least one input object, based on a width of an input tool for the user input.

6. The portable device of claim 5, wherein the determiner is further configured to divide the input area into a plurality of cells, based on the changed arrangement, and to determine the target object, based on a cell in which the user input is sensed among the plurality of cells.

7. The portable device of claim 1, wherein the controller is further configured to generate a drag command to drag the target object, in response to the user input being a drag input for dragging the input area from one point to another point.

8. The portable device of claim 7, wherein the controller is further configured to generate a control command to control an operation mapped in advance to the target object, in response to the drag input.

9. A portable device, comprising:
an output unit configured to output at least one input object to an input area, the input area being at least a portion of an area adjacent to the portable device;
a sensor configured to sense a user input to the input area;
a determiner configured to determine a target object corresponding to the user input among the at least one input object; and
a controller configured to generate a control command to control the target object,
wherein the determiner is further configured to divide the input area into a plurality of cells, based on a number of the at least one input object, and to determine the target object, based on a cell in which the user input is sensed among the plurality of cells.

10. The portable device of claim 9, wherein the controller is further configured to change an arrangement of the at least one input object, based on an angular factor representing an angle of a user's wrist.

11. The portable device of claim 10, wherein the controller is further configured to change a number of the at least one input object, based on the angular factor.

12. The portable device of claim 10, wherein the angular factor is determined based on a degree of proximity of a back of a user's hand to the sensor.

13. The portable device of claim 9, wherein the controller is further configured to generate a drag command to drag the target object, in response to the user input being a drag input for dragging the input area from one point to another point.

14. The portable device of claim 13, wherein the controller is further configured to generate a control command to control an operation mapped in advance to the target object, in response to the drag input.

15. A portable device, comprising:
a sensor configured to sense a user input to an input area, the input area being at least a portion of an area adjacent to the portable device;
a determiner configured to determine a target object corresponding to the user input among at least one input object displayed on an external device, based on an arrangement of the at least one input object, the external device being distinguished from the portable device;
a controller configured to generate a control command to control the target object; and
a communicator configured to transmit the control command to the external device,
wherein the determiner is further configured to divide the input area into a plurality of cells, based on a number of the at least one input object, and to determine the target object, based on a cell in which the user input is sensed among the plurality of cells.

16. The portable device of claim 15, wherein the determiner is further configured to map a position of the user input to the input area and a position of the target object in the arrangement of the at least one input object, and to determine the target object.

17. The portable device of claim 15, wherein the determiner is further configured to divide the input area into cells with A rows and B columns, in response to the at least one input object being arranged in the A rows and the B columns, and to determine the target object, based on the cells, A and B being natural numbers.

18. The portable device of claim 15, wherein the external device comprises a display configured to display the at least one input object, and
wherein the controller is further configured to display a cursor corresponding to a position of an input tool for the user input on the display.

19. The portable device of claim 15, wherein the controller is further configured to generate a drag command to drag the target object, in response to the user input being a drag input for dragging the input area from one point to another point.

20. The portable device of claim 15, wherein the sensor comprises a plurality of distance and proximity sensors configured to determine a position of the user input on the input area.

* * * * *